W. CHESTERMAN.
MEASURING CHAIN.
No. 182,356. Patented Sept. 19, 1876.
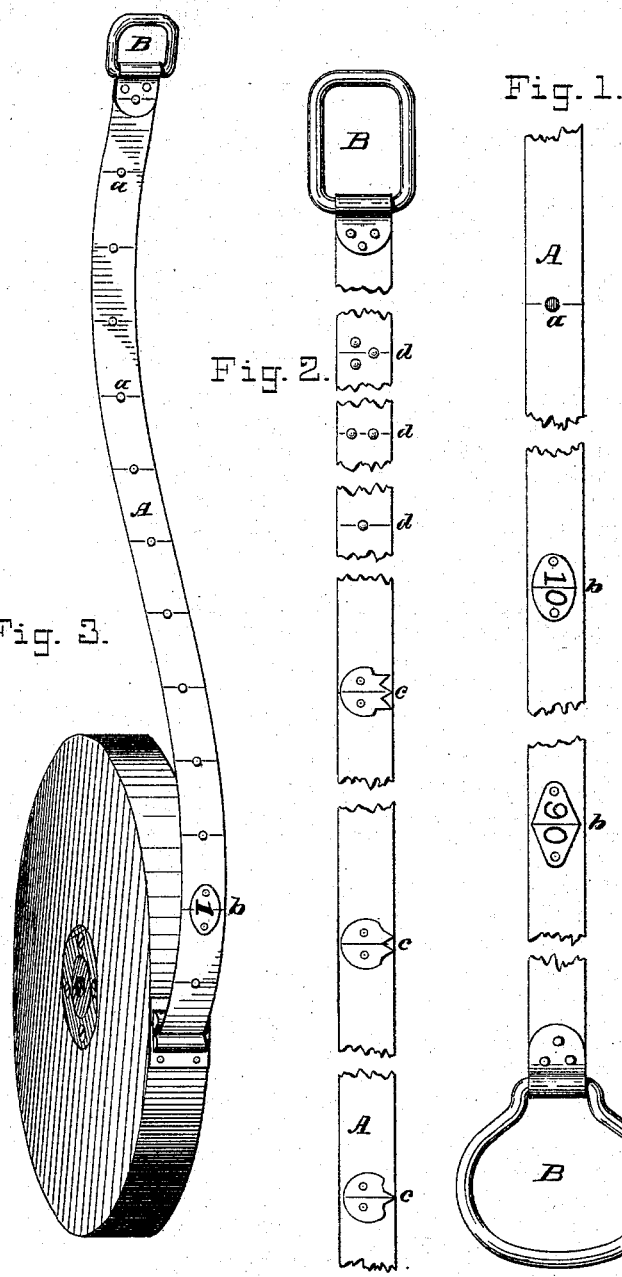

UNITED STATES PATENT OFFICE.

WILLIAM CHESTERMAN, OF SHEFFIELD, ENGLAND.

IMPROVEMENT IN MEASURING-CHAINS.

Specification forming part of Letters Patent No. 182,356, dated September 19, 1876; application filed July 14, 1876.

*To all whom it may concern:*

Be it known that I, WILLIAM CHESTERMAN, of Sheffield, in the county of York, England, have invented certain Improvements in Measuring-Bands or Band-Chains, of which the following is a specification:

This invention relates to that class of measuring tapes, bands, or "chains," so-called, constructed of a strip or ribbon of steel, and either inclosed in a leather case or provided with handles at the ends, and coiled up.

The invention consists essentially in marking the divisions or subdivisions of the chain or tape by means of metal pins or studs; also, by plates riveted to the ribbon at a suitable distance apart, as will be hereinafter set forth.

In the drawings, Figures 1 and 2 show detached portions of what is usually called a "four-pole" or Gunter's chain.

A, in general, is the steel ribbon forming the chain, and B B are the handles. These are common to chains of this description.

In carrying out my invention, as applied to a chain of this kind, I mark the smaller subdivisions or links by a stud or rivet, *a*, Fig. 1, of brass, copper, or other malleable metal, preferably, however, of some metal, having a different color from the ribbon A. At each successive ten links I rivet a plate of brass, or other metal, as at *b b*, and stamp thereon the number of links it designates, as 10, 20, 30, and so on, as in Fig. 1; or, in lieu of this, the plates may be provided with points, as at *c c* in Fig. 2, one point indicating ten links, two points twenty links, and so on. In this case the plates are recognized by their shapes. At *d d* in Fig. 2, the studs or rivets are shown arranged in groups of one, two, three, &c., to designate the divisions.

In Fig. 3 is shown a ribbon marked according to my invention, and adapted to be wound up in a case.

It will be understood that in adapting my method of marking a ribbon to the different standards of measurement, as feet, fathoms, links, meters, &c., the use of any one, two, or all of the varieties of marks shown may be required. Therefore, I do not confine myself to the precise arrangement set forth as adapted to a four-pole chain.

The common method of marking such a chain or ribbon, consisting in stamping lines and figures thereon, or etching with acid, is not permanent, as the marks are soon effaced by abrasion and rust.

By my method the markings will last as long as the ribbon, and be more easily discerned than where made in the old way.

I am well aware that the divisions on wire-chains, formed of joints or veritable links, have been commonly marked with pendulous metal tags; and I make no claim to this, nor to marking chains of this kind. Such chains are not intended to be incased, and a ribbon or tape so marked could not well be reeled into a case on account of the obstruction offered by the tags. With a tape marked as herein shown no such obstacle exists.

I claim—

1. As a new article of manufacture, a measuring tape or band of metal, having its divisions and subdivisions marked or indicated by metal studs or rivets passing through the same to render the markings more conspicuous, all substantially as and for the purposes herein set forth.

2. The combination, with the metal tape or band and rivets, as set forth, of the numbered plates *b b*, riveted to the band to mark the principal divisions thereof, substantially as specified.

W. CHESTERMAN.

Witnesses:
W. SMITH,
   *Of Sheffield, Solicitor.*
FRED D. TURNER,
  *Clerk to Messrs. Burblary & Smith,*
                *Solicitors, Sheffield.*